(12) United States Patent
Luke

(10) Patent No.: US 9,434,090 B1
(45) Date of Patent: Sep. 6, 2016

(54) PROCESS FOR THE RECOVERY AND MANUFACTURE OF VALUABLE BYPRODUCTS FROM FRACTIONATING SAND MINE WASTE PRODUCTS

(75) Inventor: Donald Allen Luke, Valrico, FL (US)

(73) Assignee: CleanWater Technologies, LLC, Valrico, FL (US)

( * ) Notice: Subject to any disclaimer, the term of this patent is extended or adjusted under 35 U.S.C. 154(b) by 811 days.

(21) Appl. No.: 13/567,247

(22) Filed: Aug. 6, 2012

Related U.S. Application Data

(60) Provisional application No. 61/574,726, filed on Aug. 8, 2011.

(51) Int. Cl.
| | | |
|---|---|---|
| *C04B 38/00* | (2006.01) | |
| *C04B 18/02* | (2006.01) | |
| *B28C 7/00* | (2006.01) | |
| *C04B 35/00* | (2006.01) | |
| *B28B 5/00* | (2006.01) | |
| *B24D 3/04* | (2006.01) | |

(52) U.S. Cl.
CPC ............. *B28C 7/0007* (2013.01); *C04B 35/00* (2013.01); *B24D 3/04* (2013.01); *B28B 5/00* (2013.01); *C04B 18/023* (2013.01); *C04B 38/0009* (2013.01)

(58) Field of Classification Search
CPC .................................. B24D 3/10; B24D 3/04
USPC ................................. 264/679, 603, 117, 122
See application file for complete search history.

(56) References Cited

U.S. PATENT DOCUMENTS

| | | | | |
|---|---|---|---|---|
| 3,848,548 A | * | 11/1974 | Bolejack, Jr. ........... | F23G 7/001 110/212 |
| 4,435,693 A | * | 3/1984 | Johnson ................... | H01B 3/10 106/468 |
| 4,797,159 A | * | 1/1989 | Spangle .................. | C04B 2/102 106/694 |
| 5,196,620 A | * | 3/1993 | Gustin et al. ................. | 588/257 |
| 5,207,830 A | * | 5/1993 | Cowan ................. | A01K 1/0154 106/672 |
| 5,268,032 A | * | 12/1993 | Malone ................... | C04B 40/02 106/690 |
| 5,994,265 A | * | 11/1999 | Barclay ................ | C05G 3/0023 504/100 |
| 6,627,083 B2 | * | 9/2003 | Rennesund et al. .......... | 210/660 |
| 7,704,317 B2 | * | 4/2010 | Bethani ........................ | 106/705 |
| 2004/0214499 A1 | * | 10/2004 | Qin .................... | A61F 13/15203 442/414 |
| 2006/0162619 A1 | * | 7/2006 | Bethani ........................ | 106/705 |
| 2007/0040307 A1 | * | 2/2007 | Lee et al. ...................... | 264/638 |
| 2007/0215010 A1 | * | 9/2007 | De La Roij ................... | 106/705 |
| 2012/0073813 A1 | * | 3/2012 | Zamora ................... | C04B 28/02 166/285 |
| 2014/0230696 A1 | * | 8/2014 | Bullerjahn ............ | C04B 7/3453 106/606 |

OTHER PUBLICATIONS

Shakhashiri. Chemical of the Week. Lime: Calcium Oxide—CaO. Chemistry 103-1. www.scifun.org.
Ricardo—AEA. States of Jersey Environment Scrutiny Panel. Review of Ash Disposal Policy and Methods. Issue No. 3 Final, Jul. 12, 2012.

* cited by examiner

*Primary Examiner* — Nahida Sultana
(74) *Attorney, Agent, or Firm* — Robert J. Varkonyi; Smith & Hopen, P.A.

(57) ABSTRACT

The present invention provides a process for producing granular material useful as aggregate for the production of lightweight construction materials and involves the mixing of a pulverized Calcium Oxide material with a dewatered clay waste material in a paddle or ribbon type mixer until reaching a state of a uniform consistency paste like material and then allowing such material to cure for several days while periodically mixing to expose new surface area thereof to the air to facilitate evaporation until the water content of the cured material is less than six percent.

14 Claims, No Drawings

PROCESS FOR THE RECOVERY AND MANUFACTURE OF VALUABLE BYPRODUCTS FROM FRACTIONATING SAND MINE WASTE PRODUCTS

RELATED U.S. APPLICATION DATA

Provisional Application No. 61/574,726 filed Aug. 8, 2011

BACKGROUND OF THE INVENTION

1. Field of the Invention

The present invention relates in general to a process for the production of a lightweight material and more specifically concerns the production of such material from a fractionating sand mine waste product.

2. Description of the Prior Art

The prior art related to this subject matter is essentially divided into two different areas. First, stabilization of naturally occurring clay deposits for the general purpose of rendering them suitable load bearing soils, and second the production of lightweight aggregate materials from a variety of naturally occurring raw material.

The literature describing stabilization of naturally occurring clays directed to the application or for the purpose of increasing soil stability is differentiated from the process and products of the present invention in that in such described applications, in-situ clays are never removed from their natural location and stabilization occurs through the creation of load bearing columns in one case, or in others, the creation of a load bearing crust within the top several inches or feet of the body to be stabilized. Such applications, by their very nature, are designed to facilitate the construction of roads or other structures in areas where this type of construction would otherwise be prohibited or at a minimum require the costly removal of the subsurface clay body and subsequent replacement with suitable construction quality soil.

In the case of the prior literature on the subject of manufacturing lightweight aggregate materials, it is important to note that the above process of the present invention is differentiated from other lightweight aggregate production processes in several significant ways. Traditional lightweight aggregates are produced by mining or otherwise extracting a natural deposit of clay which contains inherently incorporated organic matter, and firing that material in a rotary kiln. As such, the final product characteristics are dependent on the composition and make-up of the original clay deposit. The mining of natural deposits of clay produces as a starting material a clay of approximately 60%-80% solids, which starting material is thus suitable for immediate pyro-processing. However, it does have many disadvantages typically associated with the mining and extraction of naturally occurring mineral deposits including, but not limited to the remediation of the mining area, ecological disturbance, and the disposal of waste products. The process of this invention, however, has none of those disadvantages. The starting material is itself a byproduct of mining activity. The use of such byproduct reduces the environmental impact of the mining activity in that were it not converted to a beneficial use product, it would require disposal in impoundment. As such, the process and associated products of this invention qualify as "green" products because as a result of their manufacture, environmental consequences are significantly reduced. In addition, the final products of the invention are capable of a degree of customization not available within the range of naturally produced lightweight aggregates. Products with greater mechanical strength, products with lower bulk density, products with greater insulating properties, than any product currently produced from naturally occurring clay deposits can be produced by use of the present invention with none of the environmental consequences normally associated with the production of lightweight aggregates from naturally occurring clay deposits.

BACKGROUND INFORMATION

Standard Silica Sand produced by normal mining and beneficiation processes is utilized by the oil and natural gas industry in significant quantity to facilitate efficient removal of oil and natural gas. The conventional process consists of first creating a bore hole or well into the oil or natural gas formation. The depths of the well may range from as little as a few hundred feet to many thousands of feet.

Once the initial oil or gas has been extracted by conventional means from a formation, many producers engage in a practice called hydraulic fracturing in which various liquids and liquid mixtures are pumped into the well under extreme pressures to cause the underground formation to fracture. Once the fractures are created, the fracturing liquid is removed and typically, a mixture containing fractionating sand is pumped in under similarly high pressures to fill the newly created fractures and effectively prop them open. The permeability of the sand allows additional oil or gas to be recovered by the operator resulting in greater recovery of oil or gas from each well location.

The process by which the fractionating sand products are produced is one of a variety or combination of traditional beneficiation processes such as crushing, washing, cycloning, screening, sizing or other unit operations as may be prudent and necessary to process raw mineral ore. A typical sand production process begins by extraction of the raw ore from the ground by traditional mining techniques whereupon the raw ore might be crushed and then further processed to separate the primary sand product from other components of the sand laden ore. Except perhaps in the case of alluvial sand deposits, sand typically isn't found in isolation, but rather exists as a constituent of an ore material rich enough in the desirable component to warrant the expense of excavation and separating the valuable sand material.

The other constituents of the raw ore material are typically waste rock, which can be utilized for road building and other such activities, and clays or silts, primarily an Aluminum Silicate compound such as Kaolinite, Illite, gibbsite or other clay like minerals typically small in particle size. In order to produce sand of acceptable purity, these clays must be liberated and separated from the sand. Typically, this is accomplished by washing because dry separation of these extremely fine particles in not usually practical.

The composite of the clay, or non sand portion of the original ore material normally is collected in the water phase of the processing operation where it exists as a fairly low density slurry which separates or dewaters very slowly. A variety of means are employed to accelerate this separation including water recovery operations such as thickeners and centrifuges, but most frequently, simple settling ponds utilizing large land areas which seldom are ever suitable for anything other than a pasture use. The sedimentation and consolidation of these settling areas takes many years and the clay sediment seldom if ever reaches its original or natural consolidated density.

As sand processing operations progress through the ore body, several settling areas may be required to accomplish storage of the clay waste material. The clay material stored in such settling areas has few beneficial uses in it's native form unless it can be produced or converted to a form acceptable to the marketplace such as the following uses: (1) an impervious lining material for landfills and waste disposal areas where leachate entering the ground water system is of concern (2) normal or lightweight construction materials for the manufacture of lightweight concrete or road covering materials and (3) geotechnical backfill material, growth medium for reconstructed wetlands are a few examples of identified beneficial uses for this clay material when prepared in the required form.

The object of the present invention is to describe a process by which a normal sand production operation can be modified to include the recovery of the clay minerals present in the ore body and produce commercially desirable materials such as lightweight construction materials in addition to their sand products and simultaneously reduce the environmental impact of such a mining operation.

SUMMARY OF THE INVENTION

The present invention provides a process for the production of a variety of materials including a lightweight construction material from a fractionating sand mine waste product and involves the recovery of clay minerals present in a raw mineral ore body to produce commercially desirable materials such as lightweight construction materials.

The process of the invention broadly involves mixing a pulverized Calcium, or Magnesium Oxide (or a mixture thereof) material and other compounds depending on the desired end use of the final product with a dewatered clay waste material in a suitable mixing device such as a pug mill, paddle or ribbon type mixer until the composition reaches a state of a uniformity or paste like consistency and then allowing such material to cure for several days while periodically mixing to expose new surface area thereof to the air to facilitate evaporation until the free water content of the cured material is less than four to six percent. Where the desire is for a compactable, very low permeability construction liner, no additional processing is required and the material may be applied to form an impervious liner in landfill applications where liquids potentially leaching into area groundwater are of concern. In instances wherein construction aggregate or road surfacing material is the desired end product, additional materials such as silica containing compounds like Portland cement, kiln dust from Portland cement manufacture, or fine (−100M) silica sand, organic materials such as Canadian peat, sawdust, lake bottom sludge, paper mill waste other organic materials, may be added to the initial mixture to modify the pyroplastic properties of the mixture and control the final product specific gravity, bulk density, abrasion resistance, and other properties specific to the final end use. The cured material is then heated in a batch or rotary kiln to a temperature of about 2000°-2200° for 30-60 minutes and thereafter is allowed to cool to form a lightweight semi-ceramic material suitable for use as a lightweight aggregate for the production of lightweight concrete road surfacing aggregate, geotechnical backfill or other typical uses of such material.

Other objects, features and advantages of the present invention will be readily appreciated from the following description. The description is based on a specific detailed process description. However, such description does not represent the full scope of the invention. The subject matter which the inventor regards as his invention is particularly pointed out and distinctly claimed in the claims at the conclusion of the specification.

DETAILED DESCRIPTION OF THE PREFERRED EMBODIMENT

The process by which fractionating sand products are produced is described above in the preceding sections. The following description is intended to describe the process from the point at which dilute clays are produced in the sand operation to the preparation of a variety of lightweight materials.

A Sand Plant will normally perform preliminary dewatering of the dilute clay slurry to recover and recycle water. The resulting partially consolidated waste clay process stream typically is about 18%-35% solids, but may be more or less dilute. In the normal process, this waste clay stream would simply be placed in an above or below ground storage facility where it would gradually consolidate. In the modified process of the present invention, the waste clay process stream is further dewatered by conventional means such as centrifuges, filters, or even simple consolidation to a density of approximately 35% to 50% solids, which provides the necessary consistency for further processing into a variety of useful products.

Depending on the intended use of the final material, one of several steps is required. The simplest form of the present invention, is the case where the desired end product is a material of low permeability suitable for lining areas where it is desired to prevent or minimize seepage of water or other liquids through said liner. These areas may be utilized, for example, as landfills, ponds, reconstructed wetlands or other uses where the desire is to retain water or liquid within a given area and to restrict flow through the bottom or sides of such area. The initial step in the process is to first combine a pulverized Calcium or Magnesium Oxide or (mixture thereof) material with the dewatered clay. The process consists of simple mixing of these two components in a typical solids mixing device such as a pug mill, paddle or ribbon type mixer until the composition reaches a state of a uniform paste like consistency composed of approximately 0.5% to approximately 5% Calcium, or Magnesium Oxide (or mixture thereof), hereinafter simply referred to as "Calcium Oxide", material and approximately 95% to 99.5% partially dewatered clay. The resulting hydration of the Calcium Oxide to Calcium Hydroxide further dehydrates the mixture creating a paste like consistency.

The complete hydration of the Calcium Oxide takes several hours following the initial mixing step and the completion of the pozzolanic reactions takes several days to 2 weeks. This paste, or stabilized clay mixture is then allowed to "cure" for several days during which time it is periodically mixed to continue to expose new surface area to the air to facilitate evaporation of moisture from the mixture. Alternatively, this mixture could be processed further in a low temperature dryer to accelerate the removal of water. In practice, and while technically feasible, the economics of such an additional drying step might not be attractive. When the mixture has a measured free water content of approximately four to six percent, it is then suitable for use as a low permeability liner for landfills or waste disposal areas where leachate entering the groundwater is of concern. This material would be applied directly to the ground in lifts of approximately 6" and compacted to standard engineering densities, such as 95% of standard procter density. Additional layers of material would be applied similarly until the desired liner thickness was attained. The following example is illustrative of this material.

EXAMPLE 1

Approximately 10 lbs of partially dewatered waste clay was withdrawn from an industrial thickener at a density of 35% solids. To this mixture was added approximately 113.5 grams of quicklime, obtained from LaHoist North America, which had a chemical composition of approximately 94% CaO. These materials were mixed for approximately 15 minutes until the particulate lime was uniformly distributed throughout the clay. The resulting mixture was placed in large pans and allowed to stand exposed to ambient air for a period of 7 days. Each day, the pans were mixed by hand to continually expose new surface area. At the end of 7 days, the still pliable material was submitted to an engineering laboratory for physical properties analysis. The analysis measured water content and permeability, using a flexible wall permeameter. The resulting water content was approximately 4%, and the permeability was $1.2 \times 10^{-6}$ $cm^2$, indicating suitability for use as a barrier liner.

In the case where a traditional to semi-lightweight construction aggregate material is the desired end product, for example for road construction aggregate, the process utilizes the stabilized clay "soft" aggregate (essentially the lumps of stabilized clay) described above and heats it in a batch or rotary kiln to a temperature of about 2000-2200° F. for 30-60 minutes. The fired material is then allowed to cool and forms a traditional to semi-lightweight pseudo ceramic material suitable for used as an aggregate for the production of lightweight concrete, road construction, geotechnical backfill or other typical uses of such material. Preferably particle size of the material is managed by crushing and screening the fired material to the desired size for the intended use. This process sequence produces a material with an average dry bulk density of approximately 54-60 lbs per cubic foot, approximately ½ that of standard weight aggregate. The following examples are illustrative of the manufacture of this material.

EXAMPLE 2

Batch Process

Approximately 10 lbs of the material prepared as described in Example 1, was subjected to firing temperatures ranging from 1800° F. to 2200° F. in a batch laboratory scale kiln and the resulting products were evaluated for bulk density and water absorption. The range of bulk density obtained ranged from a low of 47 $lb/ft^3$ to a high of 68 $lb/ft^3$. Water absorption, a critical property for use in road sealing applications, was found to range from a high of about 16% to a low of about 2%, and was inversely proportional to the bulk density. In a further evaluation of this product, carbon black was added to the initial mixture to demonstrate the ability to produce a very dark material, felt more desirable by several potential customers for the product. The addition of Carbon Black did not change the physical properties described above, it did however produce a very dark aggregate compared to the normal light to medium tan material produced in the absence of carbon black.

EXAMPLE 3

Continuous Process

Following successful laboratory testing, approximately 7 tons of clay was prepared in accordance with the process as described herein including the various enhancements to the primary process. A number of individual lots were prepared to illustrate the various process alternatives. Individual lots were then fired at temperatures ranging between 1800° and 2200° F. in a continuous rotary kiln, approximately 3' in diameter and 52' in length. Material was fed into the end opposite the flame, or the "cool" end and exited at the flame end of the kiln. A minimum of 1 ton of material was processed for each product variation. Products were evaluated for bulk density and crush strength. For the material intended for road aggregate, the bulk density ranged from 55 to 77 $lbs/ft^3$, and the crush strength averaged approximately 125 $lbs/ft^2$. The bulk density temperature relationship established during laboratory work was found to accurately reflect the characteristics of the products produced in the continuous rotary kiln.

An enhancement to the basic process is to alter the silica to Aluminum ratio by the addition of fine (–100 mesh or finer) silica sand or other silica containing materials such as Portland cement, or kiln dust from the manufacture of Portland cement during the initial stabilization step so as to increase the total silica content to approximately 1-3 percent. The addition of silica is controlled to create a composition such that when fired, the molten mix has a softening point reached at lower temperatures than would be normally expected from the silica and allows the mixture to partially melt at lower temperatures. This is a desirable characteristic when the end product is intended to be utilized as a road coating aggregate where durability, abrasion resistance and crush strength are of significant importance. This mixture is then fired at approximately 2000-2200° F., and forms a much harder, and slightly more dense aggregate material due to the presence of the additional silica. In addition, this material has a very hard glassy outer coating which reduces its tendency to absorb materials such as water or asphalt coating oil thereby improving on its freeze-thaw characteristics and eliminates one major downside of other more traditional lightweight aggregates; their tendency to absorb coating oil. The lack of absorbance allows less coating oil to be utilized per unit of paved area, thus reducing the cost for application when compared to traditional more absorbent aggregate materials. Such material has an average dry bulk density of approximately 57-65 lbs per cubic foot, is significantly more abrasion resistant, and supremely suitable for use as a road coating aggregate when mixed with asphalt.

EXAMPLE 4

Batch Process

As a variation on Example 1 above, the pure quicklime was replaced by a mixture of quicklime and "cement kiln dust", which is essentially very fine Portland cement captured by the dust collection systems of cement kilns and is normally a waste product for the cement plant. Approximately 40% of the original quicklime was replaced by the kiln dust during the initial mixing step. This material was then fired at 1800° F.-2200° F. and evaluated for bulk density. Upon inspection, it was clear that the kiln dust had modified the pyro-plastic properties such that at the higher temperatures normally utilized, the material simply melted and fused together and rendered the material unusable as discrete aggregate particles. However, the lower temperatures resulted in unexpectedly hard, dense aggregates with a hard ceramic outer layer. Additional experimentation identified the temperature of incipient melting, which occurred at approximately 1975° F., and resulted in very hard, abrasion resistant ceramic like discrete aggregate particles with a slightly higher density than aggregates prepared at similar temperatures in the absence of the kiln dust. Material prepared without the kiln dust could not be forced to the same pyro-plastic state within the range of temperatures possible in the laboratory furnace, which was limited to 2400° F. It was determined that the addition of the kiln dust altered the silica content of the overall mixture and created a eutectic material that had a lower melting point than would be expected.

A further enhancement of the basic process is to add a fine organic material such as fine Canadian peat, saw dust or other finely divided organic material during the initial clay-lime mixing/stabilization process when the desired end use product is an ultralightweight aggregate material utilized in the manufacture of lightweight concrete. The peat is mixed with the clay and lime in a ratio of approximately 1 lb of peat to 10 lbs of clay. The mixture ratios, and in particular the amount of fine organic matter added is controlled to produce the desired final product characteristics. The final product bulk density can be maximized by increasing the organic matter addition rate. This results in a very light final product, but one that may reduce the necessary strength required for some uses. This may be desired for example, where the final product is to be utilized as an insulating material where little or no structural strength is required. One skilled in the art will recognize that manipulation of the ratios of the various constituents will result in many products with slightly different final characteristics, each applicable to a particular use. Once the constituent mix ratios are established, the organic material, clay and lime are mixed in a single step. The addition of the organic material serves several purposes. First, it is combustible, and serves as a fuel source, thus reducing the overall fuel requirement of the kiln and serving to heat the individual aggregate particles from the inside which results in a more uniform consistency of firing than would result if the heat were applied only to the outside of the particle. Second, as each peat particle burns, it leaves behind an air void in the aggregate. By varying the amount of peat added, fuel consumption can be reduced by up to 50%, and the average dry bulk density of the resulting aggregate can be reduced to approximately 36-42 lbs per cubic foot. Other materials may be substituted for the Canadian peat such as paper mill waste pulp, sawdust, or lake bottom sludge.

EXAMPLE 5

Batch Process

As a variation of the mixture preparation methodology described in example 1, fine Canadian peat was added to the mixture at the time of initial preparation and air dried as described previously. This material was then fired at temperatures between 1800° F. and 2200° F. and the resulting products evaluated for bulk density and water absorption. The range of bulk density obtained ranged from a low of 32 lb/ft$^3$ to a high of 44 lb/ft$^3$. Water absorption, a critical property for use in road sealing applications, was found to range from a high of about 20% to a low of about 5%, and was inversely proportional to the bulk density. In a further evaluation of this product, carbon black was added to the initial mixture to demonstrate the ability to produce a very dark material, felt more desirable by several potential customers for the product. The addition of Carbon Black did not change the physical properties described above, it did however produce a very dark aggregate compared to the normal light to medium tan material produced in the absence of carbon black.

EXAMPLE 6

Continuous Process

Approximately 2 tons of material was prepared as described in Example 5 above, processed as described in Example 3 above and evaluated for bulk density and crush strength. The bulk density ranged from 35-45 lbs/ft$^3$, and the crush strength averaged 80 lbs/ft$^2$. The bulk density-temperature relationship established during laboratory work was found to accurately reflect the characteristics of the products produced in the continuous rotary kiln.

EXAMPLE 7

Lightweight Concrete Testing

In order to establish that products produced as described herein were compatible with existing uses, primary of which is the use to manufacture lightweight concrete, concrete cylinder testing was undertaken by an ASTM certified laboratory. The laboratory was provided samples of the aggregate products manufactured in accordance with the processes described herein, as well as samples of 3 commercial lightweight aggregate products, identified as Gravelite, produced by Big River Industries in Louisiana, Haydite, produced by Buildex Inc., in Kansas, and Stalite, produced by Carolina Stalite Company in North Carolina. The Gravelite is an expanded clay aggregate and both Haydite and Stalite are expanded shale aggregates. Earlier testing had determined that the products produced as described herein met or exceeded the physical characteristics of the commercial products for bulk density, water absorption, particle size and were in compliance with ASTM-33D. The commercial products were supplied as ⅜"×8M mixed particle size products in compliance with ASTM-33D specifications. The products manufactured by the processes described herein were also supplied to the testing laboratory as ⅜"×8M mixed particle size products. A standard 4000 PSI concrete mix design was utilized in all testing. Multiple cylinders of each mix variant were poured and cured in accordance with standard ASTM requirements. Cured cylinders were tested in a standard hydraulic press at 7 days and 28 days pursuant to standard industry practice. In addition, for comparative purposes, additional cylinders were prepared using traditional limestone aggregates. The break strength testing is summarized as follows:

| Sample | 7 day-PSI | 28 day-PSI | Wet Density-lb/ft$^3$ |
|---|---|---|---|
| Standard Concrete Mix | 4700 | 6455 | 144 |
| Gravelite | 4025 | 5347 | 121 |
| Haydite | 4490 | 5235 | 118 |
| Stalite | 4760 | 6090 | 125 |
| PSC Std Wt | 5240 | 6672 | 124 |
| PSC ULWA | 5110 | 6262 | 121 |

EXAMPLE 8

In light of the break strength results above, additional testing was undertaken to evaluate the degree to which the Portland cement component of the concrete mix could be reduced while maintaining the required break strength properties. Additional cylinders were prepared using a 10% and 20% reduction of the Portland cement component. The break strength results are as follows:

| Sample | 7 day-PSI | 28 day-PSI | Wet Density-lb/ft$^3$ |
|---|---|---|---|
| PSC Std Wt-10% | 5560 | 6515 | 124 |
| PSC ULWA-10% | 4600 | 6170 | 119 |
| PSC Std Wt-20% | 4670 | 5945 | 122 |
| PSC ULWA-20% | 4040 | 5215 | 119 |

EXAMPLE 9

A key component in any concrete mix the range of particle sizes of the aggregates included in the mix. The industry standard coarse aggregate in referred to as a #67 stone aggregate and is in the size range of minus ¾" material. This aggregate is typically limestone or granite, depending on what material is available to the cement producer. The current commercial products are significantly limited in their ability to produce large quantities of this larger particle size aggregate for to do so reduces the availability of the finer aggregate fractions, and the current industry practice is to crush any oversize material to increase the finer fraction production rate. Aggregates manufactured in accordance with the processes described herein can be made at any particle size, and produce material suitable for substitution for the standard #67 stone coarse aggregate. Such a substitution allows for the manufacture of the lightest possible concrete without sacrificing any strength characteristics. Utilizing a light weight coarse aggregate results in reduction in the concrete density beyond that attainable with the standard weight coarse aggregate. This reduction in density translates into significantly reduced costs for the structural elements in a structure using a light weight concrete that attains the minimum DOT acceptable density of 110 lbs/ft$^3$ The previous examples 7 & 8 were carried out using standard weight #67 limestone aggregate. The following example demonstrates the resulting reduction in concrete density when both aggregates are lightweight material and the other constituents are included at normal amounts

| Sample | 7 day-PSI | 28 day-PSI | Wet Density lb/ft$^3$ |
|---|---|---|---|
| PSC Std Wt* | 5670 | 7085 | 121 |
| PSC ULWA* | 4895 | 6167 | 117 |

*Coarse aggregate substitution only

EXAMPLE 10

As was shown with in previous examples, the aggregates produced in accordance with the processes described herein demonstrate significant early strength advantages over the commercial aggregates, and again give rise to the potential to reduce the Portland cement content. This example provides a comparison to example 8 above. In this example, the Portland cement content was reduced by 10% and 20% respectively in mixes containing only aggregates produced as described herein.

| Sample | 7 day-PSI | 28 day-PSI | Wet Density-lb/ft$^3$ |
|---|---|---|---|
| PSC Std Wt-10%** | 5280 | 6020 | 117 |
| PSC ULWA-10%** | 4640 | 5295 | 114 |
| PSC Std Wt-20%** | 4280 | 4955 | 113 |
| Psc ULWA-20%** | 4020 | 4540 | 109 |

**Coarse and fine aggregates with noted Portland Cement Reduction

As set forth above, it is important to note that the above described process is differentiated from other lightweight aggregate production processes in several significant ways. Traditional lightweight aggregates are produced by mining a natural deposit of clay which contains inherently incorporated organic matter, and firing that material in a rotary kiln. As such, the final product characteristics are dependent on the composition and make-up of the original clay deposit. The mining of this natural deposit of clay produces as a starting material a clay of approximately 60%-80% solids and thus is suitable for immediate pyro-processing. However, it does have the many disadvantages, typically associated with the mining and extraction of naturally occurring mineral deposits including, but not limited to the remediation of the mining area, ecological disturbance, and the disposal of waste products. The process of this invention however has none of those disadvantages. The starting material is itself a byproduct of mining activity. The use of this byproduct reduces the environmental impact of the mining activity in that were it not converted to a beneficial use product, it would require disposal in impoundment. As such, the process and associated products of this disclosure qualify as "green" products in that as a result of their manufacture, environmental consequences are significantly reduced. In addition, the final products are capable of a degree of customization not available within the range of naturally produced lightweight aggregates. Accordingly, the present invention provides products with greater mechanical strength, products with lower bulk density, products with greater insulating properties, than any products currently produced from naturally occurring clay deposits. Furthermore, such products can be produced with none of the environmental consequences associated with the production of lightweight aggregates from naturally occurring clay deposits.

Thus, the present invention has been described in an illustrative manner. It is to be understood that the terminology that has been used herein is intended to be in the nature of words of description rather than of limitation. Furthermore, whereas the present invention has been described with respect to a particular detailed process, it should be understood that other and further modifications apart from those shown or suggested herein may be made within the true spirit and scope of this invention.

What is claimed is:
1. A process for producing granular material useful as aggregate for the production of lightweight construction materials, said method comprising:
providing a pulverized material, wherein the pulverized material is calcium oxide, magnesium oxide, or combination thereof; mixing the pulverized material with a dewatered clay waste material having a density of approximately 35% to 50% solids in a mixing device to form a paste-like material; adding a finely divided solid organic to the paste-like material, wherein the finely divided solid organic material is Canadian peat, Canadian peat fines, or dust residue from Canadian peat processing; allowing the paste-like material to cure while periodically mixing to expose new surface area thereof to the air to facilitate evaporation until the water content of the cured material is 6% or less or drying the paste-like material in a low temperature dryer until a water content of the cured material is 6% or less; heating the cured material to a temperature of approximately 1800-2200° F. for 30-60 minutes; and cooling the heated cured material.

2. The process as recited in claim 1, further comprising: providing silica or a silica-containing material; adding the silica or silica-containing material to the dewatered clay waste material; and performing the kilning step of heating the cured material to a temperature of approximately 1800-2200° F.

3. The process as recited in claim 2, wherein the silica-containing material was fractionated using a minus 100 mesh screen.

4. The process as recited in claim 2, wherein the silica-containing material is Portland cement.

5. The process as recited in claim 2, wherein the silica-containing material is kiln dust produced as a by-product of producing Portland cement.

6. The process as recited in claim 1, wherein the mixing step is performed using a pug mill, paddle-type mixer, or ribbon-type mixer.

7. The process as recited in claim 1, wherein the paste-like material is allowed to cure for more than twenty-four hours.

8. The process as recited in claim 1, wherein the paste-like material is composed of 0.5-5% calcium oxide, 0.5-5% magnesium oxide, or 0.5-5% of a combination of calcium oxide and magnesium oxide.

9. The process as recited in claim 2, wherein the silica or silica-containing material is added for form a silica content of 1-3%.

10. The process as recited in claim 1, wherein the cured material is heated to 2000-2200° F.

11. The process as recited in claim 1, wherein the cured material is heated to 1975° F., and further comprising adding silica or silica-containing material to the paste-like material.

12. The process as recited in claim 1, wherein the cured material is heated in a batch kiln or rotary kiln.

13. The process as recited in claim 1, wherein the finely divided solid organic is added at 1 pound of finely divided solid organic material for each 10 pounds of dewatered clay waste material.

14. The process as recited in claim 1, further comprising crushing and screening the cured material.

* * * * *